United States Patent [19]

Ryan

[11] Patent Number: 5,044,127
[45] Date of Patent: Sep. 3, 1991

[54] GEAR-SHAPED TOOL AND METHOD OF GENERATING GEARS

[75] Inventor: Thomas B. Ryan, Webster, N.Y.
[73] Assignee: The Gleason Works, Rochester, N.Y.
[21] Appl. No.: 465,825
[22] Filed: Jan. 16, 1990
[51] Int. Cl.$^5$ ............................ B24B 3/34; B24B 1/00
[52] U.S. Cl. ..................................... 51/287; 51/52 R; 51/123 G; 51/DIG. 1
[58] Field of Search ............. 51/52 R, 52 HB, 105 G, 51/105 GG, 105 HB, 123 G, 287, 50, 26, DIG. 14, 52, DIG. 1

[56] References Cited

U.S. PATENT DOCUMENTS

| | | |
|---|---|---|
| 1,676,419 | 7/1928 | Wildhaber . |
| 1,693,740 | 12/1928 | Wildhaber . |
| 1,821,188 | 9/1931 | McMullen . |
| 1,822,846 | 9/1931 | Wildhaber . |
| 1,830,971 | 11/1931 | Taylor . |
| 1,858,044 | 5/1932 | Head . |
| 2,102,659 | 12/1937 | Wildhaber ..................... 51/287 X |
| 2,256,586 | 9/1941 | Wildhaber ..................... 51/287 X |
| 3,813,821 | 6/1974 | Takahashi et al. ................ 51/89 |
| 3,877,176 | 4/1975 | Kotthaus ........................... 51/90 |
| 4,378,660 | 4/1983 | Wiener ........................ 51/287 X |
| 4,799,337 | 1/1989 | Kotthaus .......................... 51/287 |

FOREIGN PATENT DOCUMENTS

| | | |
|---|---|---|
| 3425800 | 1/1986 | Fed. Rep. of Germany . |
| 692127 | 3/1989 | Fed. Rep. of Germany . |
| 2155372 | 9/1985 | United Kingdom . |
| 8901838 | 3/1989 | World Int. Prop. O. . |

OTHER PUBLICATIONS

"A New Efficient Grinding Method for Oberlikon Spiral Bevel and Hypoid Gears Used in the Automotive Industry", by Machine Tool Works Oberlikon-Buhrle Ltd., CH-8050, Zurich/Switzerland.
"Basic Relationship of Hypoid Gears", parts I-III, by Ernest Wildhaber, The Gleason Works, reprinted from American Machinist, McGraw-Hill Publishing Company, 1946.
Basic Relationship of Hypoid Gears, Ernest Wildhaber, 1946.

Primary Examiner—M. Rachuba
Assistant Examiner—Bruce P. Watson
Attorney, Agent, or Firm—Ralph E. Harper; Robert L. McDowell

[57] ABSTRACT

A gear-shaped tool (30) having stock removing surfaces (38) is rotated together with a bevel or hypoid work gear (32) in accordance with their respective number of teeth, and the gear-shaped tool 30 is also moved relative to the work gear (32) in the manner of a theoretical generating gear (46) rolling through mesh with the work gear (32) for generating desired tooth surfaces (40) in the work gear (32). Generating motions of between the gear-shaped tool (30) and work gear (32) may be controlled independently of indexing motions of the gear-shaped tool (30) and work gear (32) to improve performance of a gear finishing operation.

21 Claims, 9 Drawing Sheets

GEAR-SHAPED TOOL AND METHOD OF GENERATING GEARS

TECHNICAL FIELD

The invention relates to tools and methods for finishing gears, and in particular, to a gear-shaped tool and method of using gear-shaped tools for generating tooth surfaces in bevel and hypoid gears.

BACKGROUND OF INVENTION

Tooth surfaces of bevel and hypoid gears are usually finish ground using substantially the same manufacturing methods by which their tooth spaces were originally cut out of gear blanks. Of course, a grinding tool replaces a cutting tool when finish grinding the tooth surfaces, but otherwise, the machines and tooth generating operations used for cutting and grinding are very similar.

For example, grinding wheels used for finish grinding tooth surfaces are typically cup-shaped and have abrasive surfaces in the form of surfaces of revolution which are the same as the surfaces swept by cutting edges of gear cutting tools. The grinding wheels, like the comparable cutter tools, trace a substantially circular-arc tooth shape at each instant of their engagement with work gears. Tooth surfaces are generated in the work gears by rotating the grinding wheel (or cutting tool) about a machine cradle axis in a timed relationship with rotation of the work gear. The tool together with its relative motion represent a theoretical generating gear rolling through mesh with the work gear. Tooth surfaces of each tooth space are separately generated one at a time according to an intermittent indexing operation until all of the desired tooth surfaces are generated in the work gear.

It may be noted that this, the prevailing method, provides for rotating the grinding wheel at any desired grinding speed with respect to the work gear independently of the speed at which the grinding wheel is moved with respect to the work gear for generating tooth surfaces in the work gear. The rate at which the generating motions are applied may be controlled to optimize stock removal rates, and the path of the generating motions may be controlled to make desired adjustments to the geometry of tooth surfaces being generated.

However, it may be appreciated that in comparison to cutting operations in which tooth spaces are originally cut out of gear blanks, gear grinding operations require removal of a much smaller quantity of blank stock. Accordingly, it is possible to generate tooth surfaces much faster during grinding operations than during cutting operations. Nevertheless, the prevailing method requires a significant amount of time for repositioning the grinding wheel or cutter assembly with respect to the work gear between operations on adjacent tooth spaces. This loss of potentially productive time is particularly significant during grinding operations. In fact, as much as one-half of the time required to grind all of the desired tooth surfaces in a work gear may be spent performing these indexing operations during which the grinding wheel is not productively engaged with the work gear.

Another significant drawback of the prevailing method relates to difficulties with finish grinding gears which have tooth surfaces that have been previously cut using continuous indexing operations. Cutting tools used for continuous indexing operations include cutting blades which are arranged in groups for separately engaging tooth spaces in a gear blank. In addition to the generating motions described above for intermittent indexing operations, continuous indexing operations require the cutting tools to be rotated about their respective axes in a timed relationship with rotation of the work gears so that all of the tooth spaces in the work gears are generated by a single continuous generating motion.

In contrast to the circular arc tooth shape of bevel and hypoid gears produced by intermittent indexing operations, the longitudinal tooth shape cut by continuous indexing operations generally takes the form of a cycloid (e.g., an epicycloid or hypocycloid.) The cycloidal tooth shape departs from the circular arc tooth shape by a changing direction and amount of curvature. Accordingly, a cup-shaped grinding wheel or any other shape defined by a simple surface of revolution cannot be used in the same manner practiced by the prevailing intermittent indexing method to reproduce the cycloidal tooth shape of gears cut by continuous indexing operations.

U.S. Pat. No. 3,877,176 to Kotthaus discloses an alternative type of grinding tool that is intended for use with continuous indexing operations. The blades of a continuous indexing tool are replaced by pencil shaped grinding bodies which are rotated about their axes to perform individual grinding functions analogous to the cutting functions of blades in the cutting tool. Although it would be possible to closely approximate the cycloidal tooth shape with the grinding tool of Kotthaus, the grinding tool is regarded as being very complex, difficult to maintain at required accuracy, and prone to rapid wear during use.

Another known approach uses a tapered (or conical) grinding tool having a tooth shape similar to a tapered hobbing tool that is used for cutting out tooth spaces in a continuous indexing cutting operation. For example, U.S. Pat. No. 1,693,740 and German Patent 692,127 disclose respective hobbing and grinding tools which include stock-removing tooth surfaces in the form of one or more threads of a tapered worm gear. Generally, the worm tool tooth surfaces have evenly spaced straight profiles in one section similar to a gear rack. Tooth surfaces in a first member of a work gear pair (e.g., ring gear) are formed by feeding the tapered worm tool into mesh with the first member. Tooth surfaces of the second work gear member (e.g., pinion) are generated by imparting an additional relative rolling motion between a complementary worm tool and the second member. The additional relative motion presents the complementary worm tool to the second member in a manner representing the first member rolling through mesh with the second member.

This known method of cutting and grinding gears is believed to have originated with some of the earliest designs of hypoid gears as a modified form of worm gearing. Nowadays, other tooth shapes are preferred for hypoid gears and it is generally not possible to produce these shapes with the known tapered worm tools. Perhaps even more importantly, the tapered worm tools are known to exhibit unsatisfactory cutting and grinding performance. The smaller end of the tapered tool performs differently than the larger end of the tool resulting in uneven cutting and grinding performance over the length of the tool.

Other known attempts to finish grind gears previously cut by continuous indexing operations use intermittent indexing operations while imparting cyclical grinding wheel motions to approximate the cycloidal tooth form. One such attempt, disclosed in U.S. Pat. No. 1,830,971 to Taylor, provides for rocking a flared-cup or dish-shaped grinding wheel back and forth along a tooth space following the desired tooth contour. However, the grinding wheel remains only briefly in contact with any point along tooth length, and generating operations must be slowed considerably to generate a smooth tooth surface. In fact, this grinding process may be even more time consuming than the cutting process previously used to form the tooth spaces.

Another attempt to use cyclical grinding wheel motions to approximate the cycloidal tooth shape is disclosed in U.S. Pat. No. 4,378,660 to Wiener. A high speed elliptical orbital motion is imparted to a cup-shaped grinding wheel during an intermittent indexing operation. Although it would be possible to closely match the cycloidal tooth shape of certain gear designs, other designs may not be adequately matched. Any departure from the desired cycloidal tooth shape increases the amount of grinding stock that must be left by the cutting operation, thereby adversely affecting grinding time, and may compromise performance characteristics expected from the desired tooth design. Of course, since intermittent indexing is used, a significant portion of production time is lost to the indexing operations.

A different approach to finish grinding tooth surfaces in bevel and hypoid work gears from those described above (which have attempted to reproduce at least some of the characteristics of the cutting method used to form tooth spaces in the work gears) is disclosed in U.S. Pat. No. 4,799,337 to Kotthaus, British Patent Application 2 155 372 and German Patent Application 34 25 800. Instead of attempting to adapt gear cutting methodology to grinding, this different approach is similar to other known gear finishing operations such as lapping, shaving and burnishing wherein the finishing tool is designed as a mating gear. In fact, the underlying principles of the approach are perhaps best explained in U.S. Pat. No. 2,256,586 to Wildhaber for a variety of such finishing operations. The approach involves rotating a gear-shaped tool having tooth surfaces coated with a thin layer abrasive material in mesh with a work gear. More particularly, the tool takes a form of a hypoid gear having an axis of rotation that is offset from the axis of the work gear. The amount of offset and the rotational speeds of the tool and work gear are controlled to produce a desired amount of sliding between the surfaces of the tool and work gear.

This different approach is distinguished from the above-described grinding method using a tapered worm tool by providing for the tool to be designed as a mating gear to a work gear produced by any of the known cutting methods. Tooth surfaces of both members of a work gear set may be generated to desired shape by separately rotating the work gear members in mesh with respectively mating gear-shaped tools.

Two significant advantages may be noted of this different approach. First, the approach may be practiced independently of the type of method used to cut tooth spaces in work gear blanks. Second, the gear-shaped tool remains in continuous contact with the work gear throughout the entire grinding operation. The first-mentioned advantage renders the approach more versatile than other methods linked to particular cutting practices, and the second-mentioned advantage provides for a minimum amount of production time to finish grind tooth surfaces in the work gears.

Despite these known advantages, two controlling practical considerations are believed to have limited commercial acceptance of the approach. The first consideration relates to the design of the gear-shaped tool as a conjugate mating member of the work gear. Once the tool is made, little can be done in regard to the making of routine developmental changes to work gear geometry, e.g., to correct or modify tooth surfaces and their prospective contact characteristics with the work gear's actual mating gear member. For example, it is known from U.S. Pat. Nos. 2,256,586 and 4,799,337 to adjust the operating positions between the tool and work gear while they are being rotated together in the manner practiced on known gear lapping machines (i.e., "V and H" or vertical and horizontal movements between the members of gear set being lapped), but these adjustments produce inconsistent results and only limited types of changes to the work gear geometry. Changes made to the geometry of the gear-shaped tool to effect routine developmental changes to work gear geometry are difficult and very expensive to make. In addition to performing an operation to modify the gear-shaped tool geometry, the expensive abrasive material on the tooth surfaces of the tool must be removed either prior to or in the course of that operation, and a new layer of abrasive material must be applied to the modified surfaces of the tool.

The second practical consideration working against commercial acceptance of this approach relates to variations in the grinding characteristics of the gear-shaped tool throughout each tooth mesh with the work gear. The gear-shaped tool and the work gear, like any other mating gears, roll with each other along a path of contact. At each point along this path, a different instant line of contact is defined on the tooth surface of the work gear which tends to vary in length along the path of contact. Typically, the instant line of contact tends to shorten as the path of contact moves toward the perimeter of the work gear tooth surface.

In practice, the instant line of contact more closely resembles an elliptical area of contact due to stock allowances, but the point remains the same, namely, the instant contact characteristics between the gear-shaped tool and work gear tend to vary along the path of contact on each work gear tooth surface. Further, during much of the period of contact along each gear tooth surface, other work gear teeth may also be in contact with other abrasive tooth surfaces of the tool. These variations in the length of contact between gear teeth and number of gear teeth in contact throughout each mesh cycle produce significant variations in the grinding performance of the gear-shaped tool. Such variations may result in uneven wear over the abrasive tooth surfaces of the tool, in undesirable changes to work gear tooth surface geometry, and in undesirable variations in the finish (i.e., roughness) across the tooth surfaces.

Thus, although the approach of finish grinding bevel and hypoid gears with gear-shaped tools provides important advantages over the prevailing method of finish grinding gears, even more significant practical problems remain with implementing such an approach on a commercial basis. Further, it may be appreciated that these practical problems reflect and undesirable "trade off" with certain of the more important features and advantages of the prevailing method.

For example, the prevailing method provides much more flexibility for influencing desirable tooth contact characteristics and grinding conditions over tooth surfaces of work gears by controlling tooth surface generating motions independently of the rotational speed of the grinding tool. Unlike the known method for using gear-shaped grinding tools, the rotary sweep of the grinding wheel of the prevailing method only defines an instant line of contact with the work gear, and separate generating motions are used to define the remaining instant lines which complete the work gear tooth surfaces.

In contrast, the same relative rotational motion of the gear-shaped tool and work gear about their respective axes which is required for purposes of achieving a desired grinding speed is also the same motion which governs the rate at which successive instant lines are generated on the tooth surfaces of the work gear. It is known from the general machining art that generating rates of that magnitude are not conducive to good grinding conditions. In fact, such high generating rates may be considered orders of magnitude greater than preferred generating rates for optimizing grinding conditions.

It should be noted that before tooth generation can take place, the tool must be fed into engagement with the work gear. For example, U.S. Pat. No. 4,799,337 proposes a variety of such feed motions for moving a gear-shaped tool into operative engagement with a work gear, including one that corresponds to what would otherwise be a generating motion about a machine cradle axis of a conventional bevel and hypoid generating machine. However, all of these known feed motions merely provide for moving gear-shaped tools into desired operating positions with respect to work gears and do not significantly affect the rate at which successive instant lines are generated on the tooth surfaces of work gears. In fact, most, if not all, the instant lines of contact on the desired surface of the work gear are generated at a single feed position corresponding to a full depth of engagement between the known gear-shaped tools and work gears.

In view of the above discussion of the major known practices for finish grinding tooth surfaces of bevel and hypoid gears, it may be appreciated that no solution has been found which overcomes drawbacks of the prevailing method without compromising important features of that method which are believed to be at least partly responsible for the method having been successful for over sixty years.

Having set forth certain important problems of the prior art to be solved by the present invention, it is considered of further importance to note certain fundamental teachings of the art to more completely describe the state of the art in which the invention was made. Of particular importance to the present invention is the long-standing concept of a so-called "basic member." A good explanation of this concept by its author is found in U.S. Pat. No. 1,676,419 to Wildhaber.

A basic member may be defined as being one of a of a pair of complementary theoretical generating gears which are respectively conjugate to the members of a conjugate gear pair. By way of this definition, it is understood that two members of a gear pair are conjugate to each other if each member is respectively conjugate to one of a pair of complementary basic members. Complementary theoretical generating gears, and in particular, basic members may be understood to share the same tooth surfaces, opposite sides of which are regarded as the effective tooth surfaces of the respective complementary generating gears. The concept the basic member explains how tooth surfaces in a pair of work gears may be generated by tools representing theoretical generating gears.

In practice, however, respective tools and motions used to generate mating members of gear pairs depart slightly from the requirements of basic members. This departure in practice from the concept of the basic member has been necessitated for two reasons. First, gear members of a pair are usually designed to depart from conjugacy by a controlled amount of mismatch to accommodate tooth distortions under expected loads and to permit some adjustability in the mounting locations of the gear members. Second, inherent characteristics of the tooling used in certain generating operations precludes an exact representation of a basic member.

Nevertheless, the concept of the basic member continues to provide a sound theoretical basis which may be used to define appropriate motions for generating conjugate tooth surfaces in a pair of work gears. Basic members which are intended to generate tooth surfaces in a conjugate gear pair must fulfill two particular kinematic requirements. First, relative angular rotation of a basic member with respect to either member of the conjugate gear pair must define an instant axis of rotation coincident with the instant axis of rotation of the conjugate gear pair. Second, relative linear velocity of points of contact between the kinematic pitch surfaces of the basic member and either member of the conjugate gear pair (i.e., points on the instant axis) must be directed along the instant axis in a fixed ratio with the relative angular velocity along the instant axis matching a similar ratio of linear and angular velocities between the conjugate members. In other words, a basic member in mesh with either of a pair of conjugate gears must define the same "lead" (i.e., axial advance per radian of turning about instant axis) as the meshing pair of conjugate gears themselves.

In the case of bevel gear pairs, the relative linear velocity along the instant axis at points of contact on the instant axis is zero. Accordingly, it is possible to define a basic member of bevel gear pairs as another bevel gear having an appropriate number of teeth for a given pitch angle (i.e., angle between gear axis and instant axis) which defines an instant axis position coincident with the instant axis of the gear pair. However, hypoid gear pairs include axes which are offset with respect to each other resulting in a component of linear velocity along the instant axis of the pair. It is known that it is generally not possible to define a basic member as another hypoid gear matching the lead of a hypoid gear pair. Instead, the basic member must include a supplemental linear velocity with respect to the hypoid gear pair timed with its rotation. For example, a supplemental linear velocity may be applied along the axial of a basic member defining the basic member as a helicoidal segment.

SUMMARY OF THE INVENTION

The present invention incorporates the concept of a basic member as a point of departure for defining a new tool and method for finishing tooth surfaces of bevel and hypoid gears. In particular, the invention is directed to overcoming the drawbacks of the prevailing grinding method while solving the remaining practical problems with using a gear-shaped tool to finish grind tooth surfaces of bevel and hypoid gears. Proposed for this purpose are a new gear-shaped tool and a method of using the tool which together provide for overcoming these drawbacks and problems.

In contrast to the known use of gear-shaped tools in which tooth surfaces are generated with the same motions and at the same rate that the tool and work gear are rotated through mesh, the present invention provides a new gear-shaped tool and new generating motions for using the tool which enable the rate at which the tooth surfaces are generated (i.e., generating rate) to be controlled independently of the rate at which the tool and work gear are rotated through mesh (i.e., indexing or grinding rate). In other words, the present invention provides for using a gear-shaped tool in a manner analogous to the prevailing method in which a grinding wheel is rotated about its axis at any desired grinding speed independently of the speed at which the grinding wheel is moved for generating a tooth surface of a work gear. However, the present invention also retains the advantages of a continuous indexing operation in which all of the tooth spaces of a work gear are generated by a single continuous generating motion.

The concept of the basic member is used as a point of departure for defining a theoretical generating gear to be represented by the gear-shaped tool and its motions with respect to the work gear. In particular, the theoretical generating gear of the present invention is defined by modifying the basic member between the gear-shaped tool and work gear to include an additional relative motion with respect to the gear-shaped tool and work gear. Tooth surfaces of the theoretical generating gear are defined conjugate to the desired tooth surfaces of the work gear, and tooth surfaces of the gear-shaped tool are defined conjugate to the complementary tooth surfaces of the theoretical generating gear. However, since the theoretical generating gear departs from the requirements of a basic member, the tooth surfaces of the gear-shaped tool depart from conjugacy with the desired tooth surfaces of the work gear.

In other words, although the theoretical generating gear is conjugate to both the gear-shaped tool and the work gear, most points on the tooth surface of the theoretical generating gear must be rotated different amounts to define points of contact with the tool or work gear. It may be noted that relative rotation of the theoretical generating gear about its axis with respect to the axis of the gear-shaped tool is kinematically equivalent to rotation of the gear-shaped tool axis about the axis of the theoretical generating gear in the opposite direction. Accordingly, it is possible to rotate the gear-shaped tool axis about the axis of the theoretical generating gear into positions at which points of contact between the theoretical generating gear and the gear-shaped tool also correspond to points of contact with the work gear. Thus, even though the gear-shaped tool and work gear according to the present invention are not conjugate to each other, the gear-shaped tool may be moved in the manner of a theoretical generating gear conjugate to the work gear. At each instant of this additional relative motion, the gear shaped-tool and work gear include tooth surfaces that are mismatched with respect to each other but contact along a line corresponding to an instant rotational position of a theoretical generating gear in mesh with the work gear.

It is preferred that the theoretical generating gear departs from a basic member by including a supplemental motion timed with its rotation. More particularly, it is contemplated that the theoretical generating gear may include a component of acceleration that produces no change in velocity at one rotational position of the gear. Thus, at one rotational position of the theoretical generating gear, the theoretical generating gear is coincident with the basic member. Since the tooth surfaces of the gear-shaped tool and work gear are conjugate to the complementary tooth surfaces of the theoretical generating gear, the surfaces of the tool and work gear are also coincident to each other at the one rotational position of the theoretical generating gear that is coincident with the basic member. In other words, the gear-shaped tool and work gear may be rotated about their respective axes defining only a single instant line of contact on their mating tooth surfaces corresponding to one rotational position of the theoretical generating gear or basic member.

Other instant lines of contact on the tooth surfaces of the work gear are defined by other rotational positions of the theoretical generating gear. As explained above, the gear-shaped tool, being conjugate to the theoretical generating gear, may be moved in a manner representing the other rotational positions of the theoretical generating gear with respect to the work gear. Through each of these positions, a different basic member is momentarily defined between the gear-shaped tool and work gear that is coincident with the instant position of the theoretical generating gear. Thus, new lines of contact between the tool and work gear may be generated by relative motions of the tool an-d work gear reproducing the motion of a theoretical generating gear in mesh with the work gear.

Although the representative motions of the gear-shaped tool have been referred to above only in terms of rotation about the axis of the theoretical generating gear, it is important to note that the gear-shaped tool is moved along a path incorporating all of the motions which define the theoretical generating gear. For example, if the basic member from which the theoretical generating gear departs is defined as a helicoidal segment, the motions of the gear-shaped tool include a translation along the axis of the theoretical generating gear as well as the supplemental motion (e.g., acceleration) which distinguishes the theoretical generating gear from the basic member.

Tooth surfaces of the novel gear-shaped tool of the present invention are defined by the desired tooth surfaces of the work-gear together with the motions of the theoretical generating gear. For purposes of defining tooth surfaces of the gear-shaped tool, the work gear may be considered in mesh with the theoretical generating gear, defining from the known tooth surfaces of the work-gear conjugate tooth surfaces in the theoretical generating gear. The theoretical generating gear, in turn, may be considered in mesh with the gear-shaped tool, defining from the complementary surfaces of the theoretical generating gear conjugate tooth surfaces of the gear-shaped tool. The supplemental motion which distinguishes the theoretical generating gear from the basic member is determined so that a desired amount of mismatch is generated between the work gear and gear-shaped tool.

The modified gear-shaped tool and work gear may be rotated about their axes in accordance with their respective tooth numbers while generating only a single line of contact on the surfaces of the work gear. All other points on the surface of the work gear are mismatched with respect to the surface of the gear-shaped tool. However, other instant lines of contact completing the tooth surfaces of the work gear may be generated by moving the tool in a manner representative of the theoretical generating gear which is conjugate to both the gear-shaped tool and work gear.

Thus, it is possible in accordance with the present invention to rotate the tool and work gear together about their respective axes at any desired speed of relative rotation in the ratio of their respective tooth numbers independently of the speed at which the instant lines of contact on the tooth surfaces of the work gear are generated. For example, it is possible to control the rate at which the tooth surfaces are generated along different points on the path of contact between the tool and work gear to compensate for variations in the length of the line of contact between them or in the number of teeth in contact. Similarly, the rate of relative rotation between the tool and work gear may be adjusted to influence other grinding characteristics including tooth surface finish. However, it is especially important to note that the present invention provides a significant advantage over the known use of gear-shaped tools by providing for high grinding speeds with much slower and more reasonable speeds for generating the tooth surfaces.

Of course, since the tooth surfaces of the work gears include a certain amount of grinding stock, it is necessary to relatively feed the gear-shaped tool into engagement with the work gear to reach a first operative position at which generation can take place. Although it is preferred that this feed motion take place by angularly adjusting the respective axes of the gear-shaped tool and work gear about a pivot axis perpendicular to both (i.e., corresponding to a "swing feed" of a gear lapping machine), it would also be possible to use any of the feed motions disclosed in U.S. Pat. No. 4,799,337 for this purpose.

Another important advantage of the present invention relates to improved flexibility for making developmental changes to tooth contact characteristics in work gears without requiring any modification to the gear-shaped tool. Since additional stock is removed from the tool with respect to a conjugate mating member (i.e., mismatch), it is possible to influence tooth contact characteristics of the work gear by modifying the supplementary motions of the tool to compensate for only a part of the additional stock removed from the tool. Further, since the tooth surfaces of the work gear are not only defined by the tooth surfaces of the tool rolling through mesh with the work gear at a predetermined relative rate, but also are defined by the relative supplementary motions of the tool, the surfaces of the tool may be defined within a wider tolerance which decreases manufacturing cost of the tool.

These and other features and advantages will become more apparent from the following detailed description of the invention which makes reference to the accompanying drawing figures as briefly described below.

BRIEF DESCRIPTION OF DRAWING FIGURES

DETAILED DESCRIPTION OF PREFERRED EMBODIMENTS

The present invention may be understood to incorporate some of the most fundamental teachings in the bevel and hypoid gear making art. In particular, the present invention incorporates the concept of the basic member as a point of departure for defining a new gear-shaped tool and new motions for using the tool to finish tooth surfaces in bevel and hypoid gears. A brief explanation of this concept is described below with reference to FIGS. 1 through 3.

Figure 1:
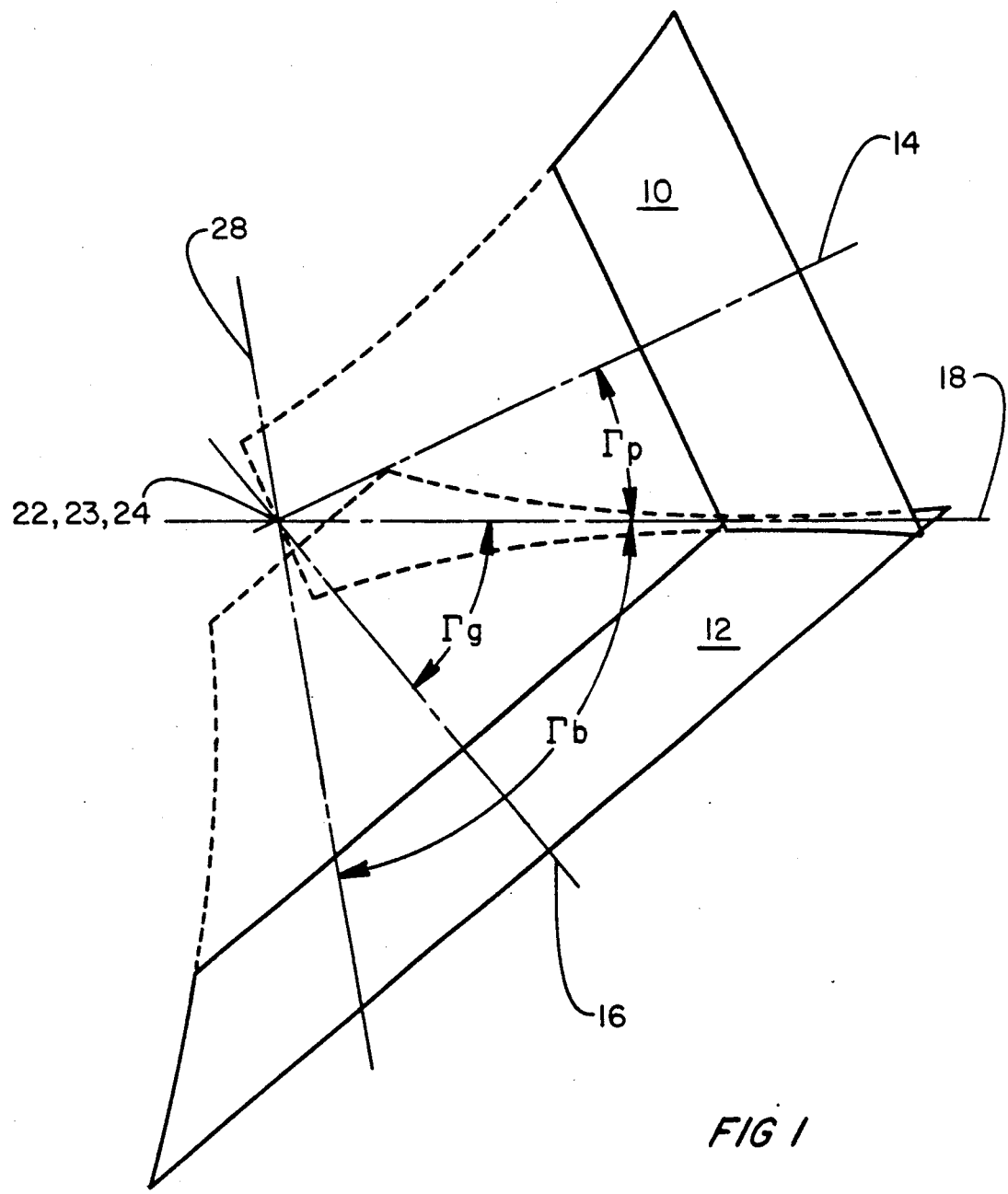
FIG. 1 is a view showing the kinematic pitch surfaces of a pair of hypoid gears in a plane parallel to the respective axes of the gears.

In FIG. 1, kinematic pitch surfaces of a pinion 10 and a ring gear 12 are shown in positions which contact along an instant axis 18. Relative rotations of the pinion and gear about their respective axes 14 and 16 define instant axis 18 as a generatrix of their respective pitch surfaces. Pitch angles $\Gamma p$ and $\Gamma g$ of the pinion and ring gear measure respective angular separations of pinion axis 14 and ring gear axis 16 from instant axis 18.

Figure 2:
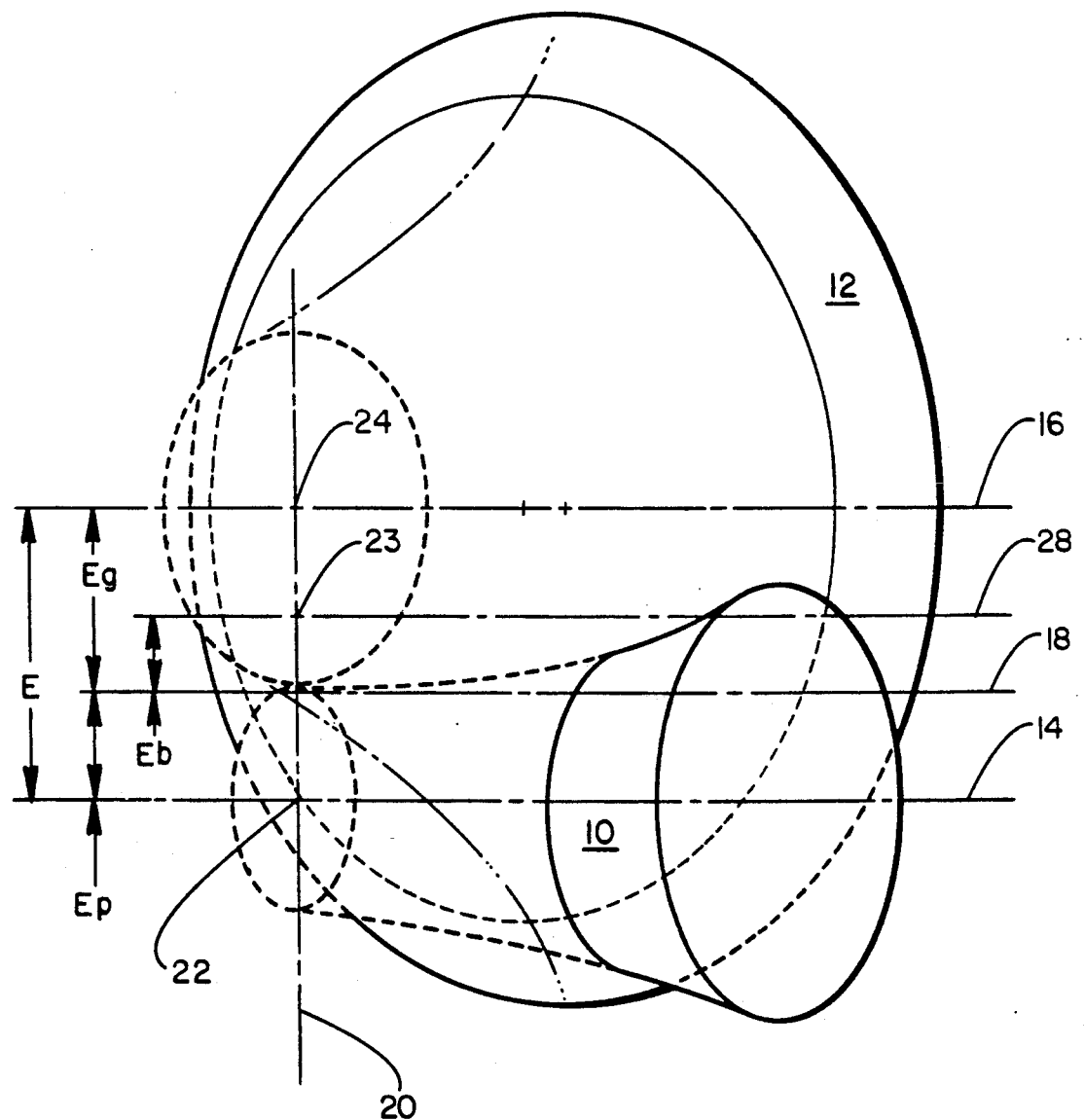
FIG. 2 is a second view of the same gear pair perpendicular to the first view in a plane within which the respective axes of the gear pair project parallel to each other.

In the view of FIG. 2, the respective axes 14 and 16 of the pinion and ring gear are shown offset through distance E along a line 20 connecting respective crossing points 22 and 24 along the pinion and gear axes. Instant axis 18, being a generatrix of the kinematic pitch surfaces of pinion 10 and ring gear 12, is offset from the pinion and gear axes along the same line 20 through respective distances Ep and Eg. The distances Ep and Eg are calculated as follows:

$$Ep = E * \frac{\sin \Gamma p * \cos \Gamma g}{\sin(\Gamma p + \Gamma g)} \text{ and}$$

$$Eg = E * \frac{\sin \Gamma g * \cos \Gamma p}{\sin(\Gamma p + \Gamma g)}.$$

Relative motion between the pinion and ring gear can be resolved into a turning motion about instant axis 18 together with a sliding motion along instant axis 18. The combined turning and sliding motion may be defined as a lead or axial advance per radian of turning motion about the instant axis in accordance with the following equation:

$$L = E \cdot \frac{\sin \Gamma p \cdot \sin \Gamma g}{\sin(\Gamma p + \Gamma g)}$$

A basic member conjugate to each member of a conjugate gear pair must share the same instant axis and lead with each member of the pair that are defined between the two members of the pair. Although any number of basic members may be defined which meet those criteria, FIGS. 1 through 3 have been arranged to depict features of a basic member in the form of a helicoidal segment 26. Axis 28 of the helicoidal segment forms pitch angle $\Gamma$b with instant axis 18 and intersects offset line 20 at crossing point 23 located a distance Eb from the instant axis. The distance Eb may be calculated as follows:

$$Eb = E \cdot \frac{\sin \Gamma b \cdot \cos[\Gamma b - (\Gamma g - \Gamma p)]}{\sin(\Gamma p + \Gamma g)}$$

The helicoidal segment may be understood to include a theoretical number of teeth Nb in accordance with the following relationship:

$$Nb = Np \cdot \sin(\Gamma p + \Gamma b) \cdot [\cotan \Gamma p - \cotan(\Gamma p + \Gamma b)]$$

where Np is the number of teeth in the pinion. This relationship provides for defining an instant axis between the helicoidal segment and each member of the gear pair that extends in the same direction as the instant axis 18.

The helicoidal segment also includes a translating motion along its axis in time with its rotation so that its relative linear motion with the kinematic pitch surfaces of the pinion or ring gear is directed along the instant axis and matches the lead L defined between the pinion and ring gear. The translating motion of the helicoidal segment may also be defined as a lead that may be calculated as follows:

$$Lb = E \cdot \frac{\sin(\Gamma b + \Gamma p) \cdot \sin(\Gamma b - \Gamma g)}{\sin(\Gamma p + \Gamma g)}$$

Figure 3:
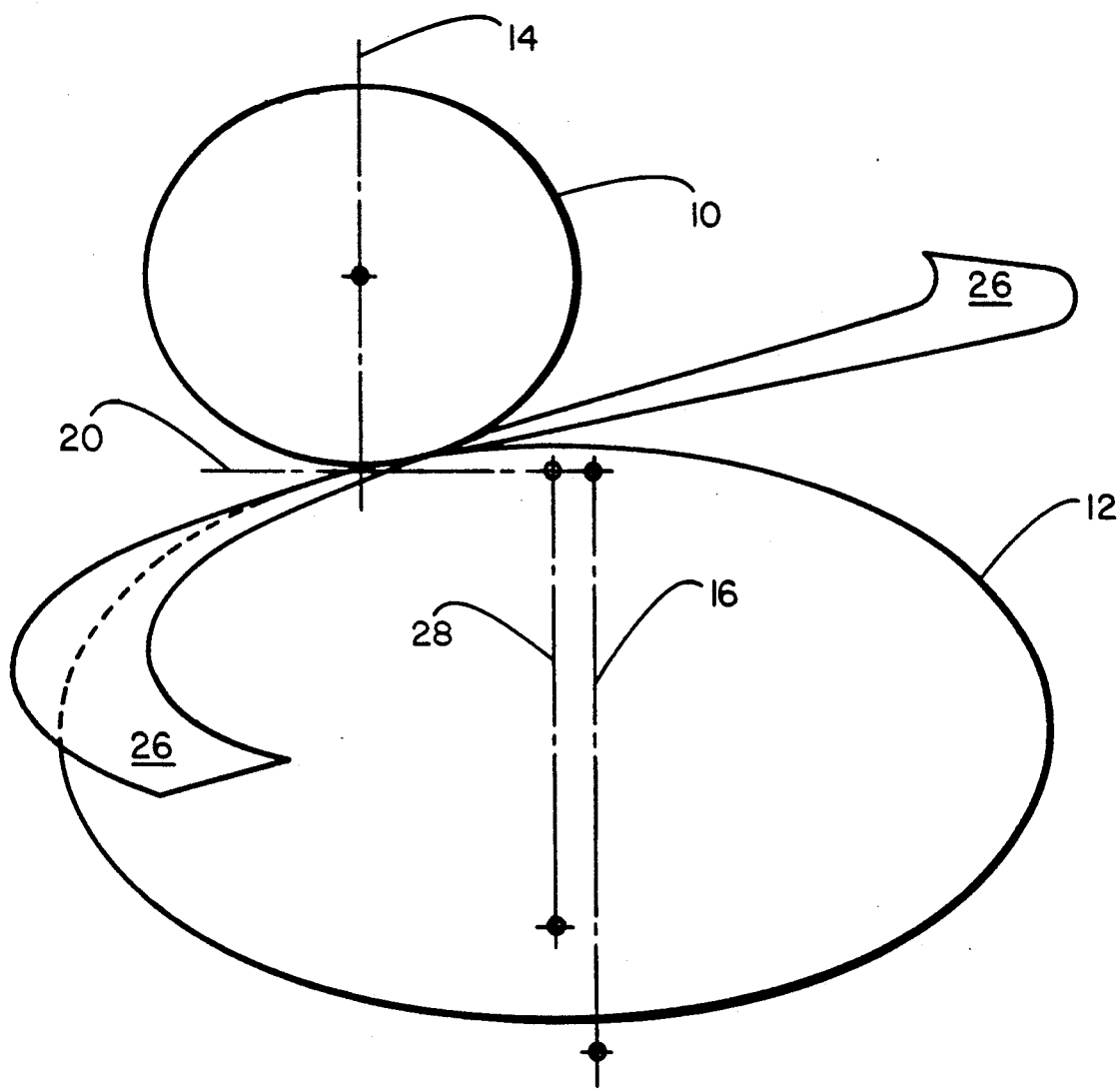
FIG. 3 is a third view perpendicular to the other two also showing a kinematic pitch surface of a basic member.

A view of the basic member as a helicoidal segment 26 is shown in FIG. 3 taken along instant axis 18. The helicoidal segment, defined as a basic member, may include complementary tooth surfaces which contact tooth surfaces of each member of the hypoid gear pair 10, 12 along the same lines of contact that the tooth surfaces of pinion 10 and ring gear 12 contact each other at all positions of mesh. In other words, the helicoidal segment is conjugate to both members of the conjugate gear pair.

Figure 4:
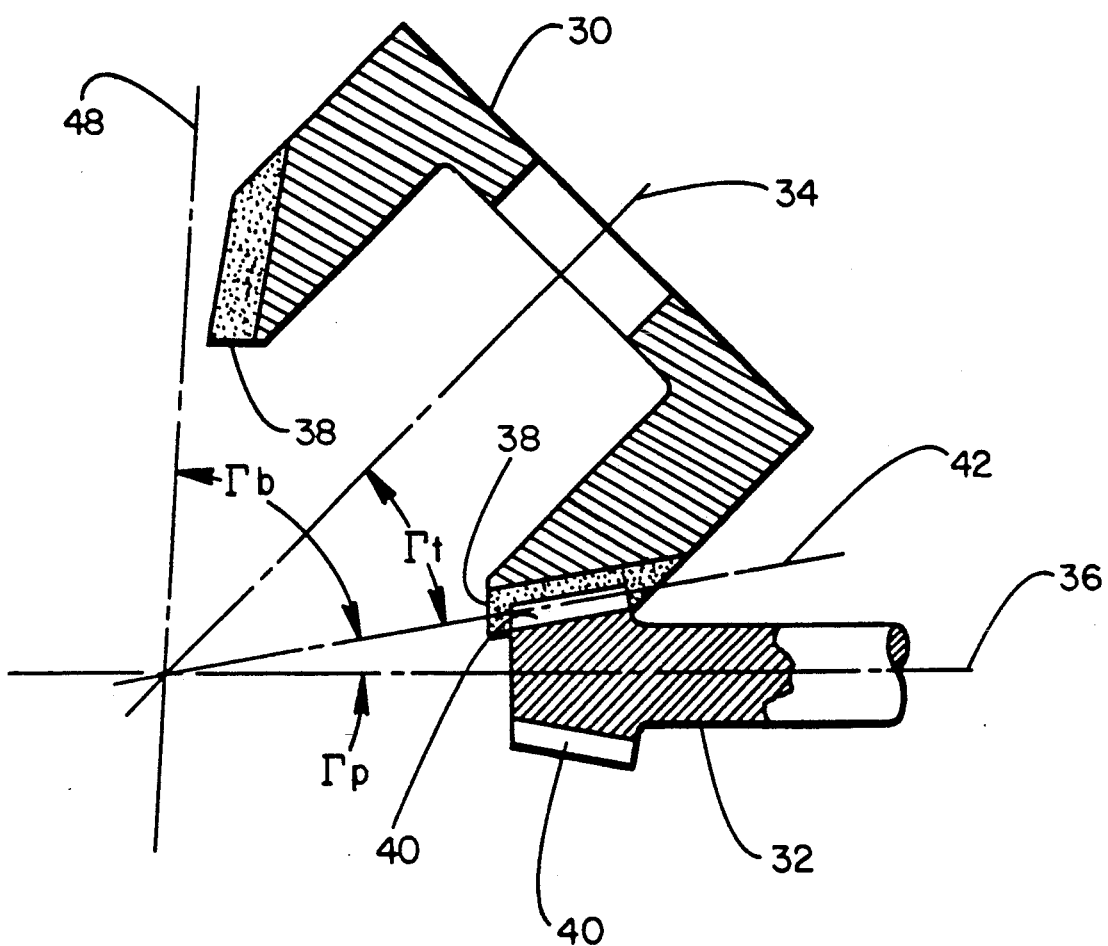
FIG. 4 is a cross sectional view of the gear-shaped tool of the present invention in engagement with a pinion work gear in a plane parallel to both the tool and work gear axes.

In accordance with the present invention, the above described relationships between members of a hypoid gear pair are understood to provide a point of departure for defining a new gear-shaped tool and method for finishing tooth surfaces in bevel and hypoid gears. A cross sectional view of the novel gear-shaped tool 30 of the present invention is illustrated in FIG. 4 at one position of engagement with a pinion work gear 32. The tool includes tooth surfaces 38 that may be coated with an abrasive material such as cubic boron nitride in accordance with well known practices in the art. The tool is depicted with an axis of rotation 34 that is oriented at kinematic pitch angle $\Gamma$t with respect to instant axis 42.

Pinion work gear 32, also shown in cross section, is depicted with tooth surfaces 40 and an axis 36 inclined to instant axis 42 through kinematic pitch angle $\Gamma$p. Although not evident from FIG. 4, it is intended for axis 34 of gear-shaped tool to be offset from axis 36 of the pinion work gear in the manner similar to the hypoid gear pair of FIG. 2.

It may be appreciated that it would be possible to define a basic member between a gear-shaped tool and pinion work gear in the same manner described for the pinion and ring gear pair of FIGS. 1 through 3. In fact, if the gear-shaped tool illustrated in FIG. 4 were to be defined in accordance with prior teachings, it would be possible to define a basic member 44 having complementary tooth surfaces conjugate to both the tooth surfaces of the gear-shaped tool and the desired surfaces of the pinion work gear. In other words, since the tooth surfaces of the known gear-shaped tool are made conjugate to the desired tooth surfaces of a work gear, a basic member may be defined between the tool and work gear in the same manner required for any other hypoid gear pair.

In contrast, abrasive surfaces 38 of gear-shaped tool 30 of the present invention depart from conjugacy with the desired tooth surfaces 40 of pinion work gear 32. Instead of defining abrasive surfaces 38 of the tool conjugate to the tooth surfaces of a basic member, the surfaces 38 of the tool of the present invention are defined conjugate to tooth surfaces of a specially adapted theoretical generating gear 46. Although complementary surfaces of theoretical generating gear 46 are also defined conjugate to both the abrasive surfaces 38 of the tool and the desired tooth surfaces 40 of the work gear, the tooth surfaces of the theoretical generating gear differ from the tooth surfaces of the basic member.

Figure 5:
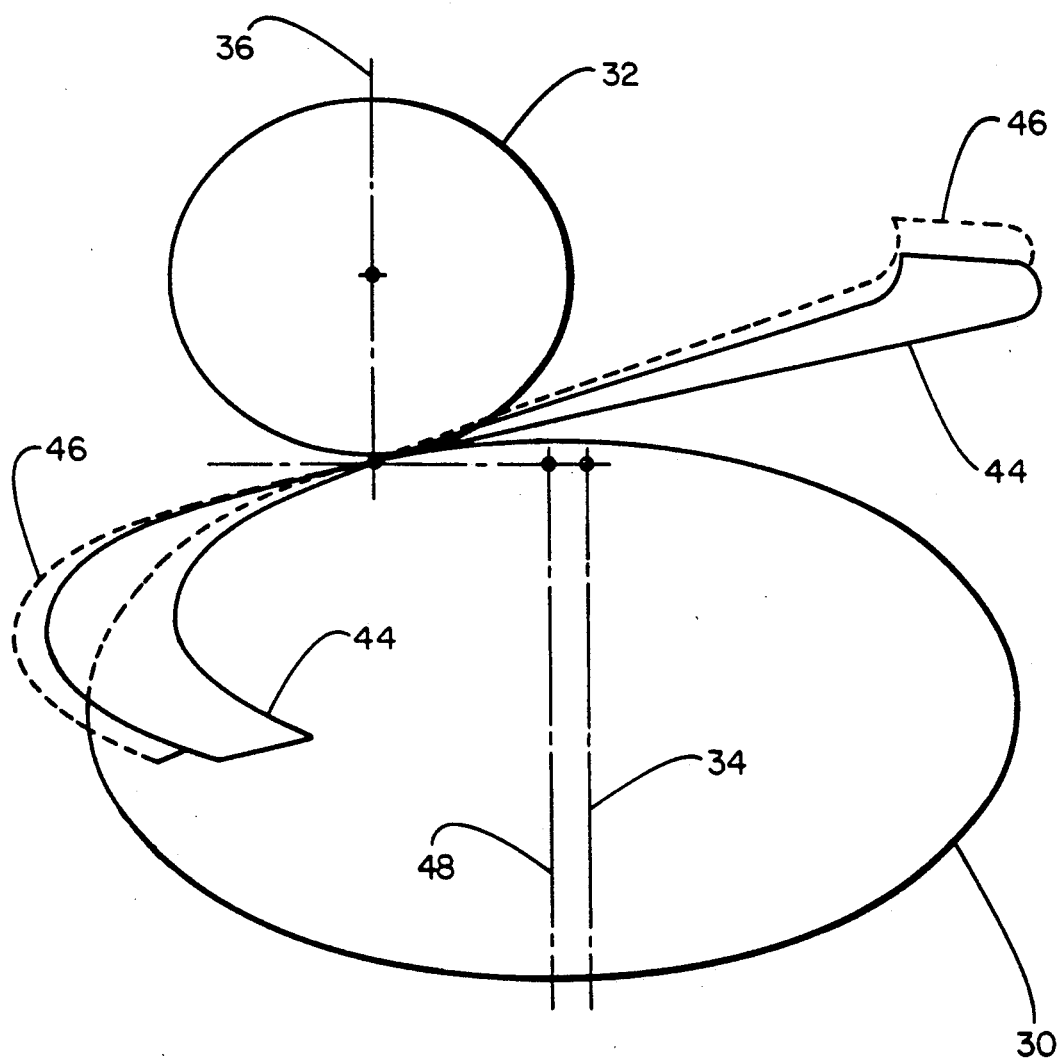
FIG. 5 is a view of the kinematic pitch surfaces of gear-shaped tool and work gear similar to the type of view shown in FIG. 3 comparing the pitch surface of a theoretical generating member to a basic member.

In FIG. 5, the kinematic pitch surface of theoretical generating gear 46 is shown in dashed line to depart from the pitch surface of basic member 44. In other words, the relative motions of the theoretical generating gear with respect to the gear-shaped tool 30 and pinion work gear 32 do not meet the requirements of a basic member. However, the theoretical generating gear may share the same axis 48, pitch angle $\Gamma$b, offset Eb and tooth number Nb with the basic member.

Figure 6:
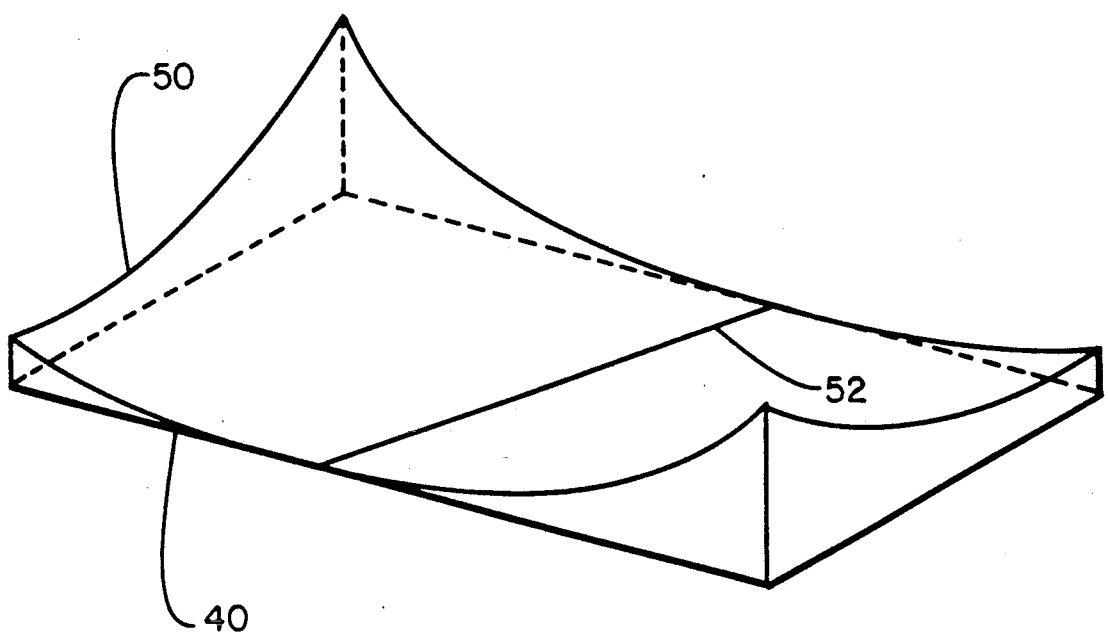
FIG. 6 is a schematic view comparing a desired tooth surface in a work gear to a surface produced at one generating position of the gear-shaped tool.

Nevertheless, since theoretical generating gear 46 to which both the gear-shaped tool 30 and work gear 32 are conjugate is not a basic member, the gear-shaped tool and work gear are not conjugate to each other. Thus, when rotated together about their respective axes 34 and 36 in accordance with the ratio of their tooth numbers, abrasive surfaces 38 of the gear-shaped tool do not contact desired tooth surfaces 40 of the work gear along the same lines of contact that would be made by a conjugate mating member. In fact, the abrasive surfaces of the gear-shaped tool 38 rotating through mesh with the work gear define tooth surfaces 50 (see FIG. 6) in the work gear which are mismatched with respect to the desired surfaces 40 of the work gear.

Figure 7:
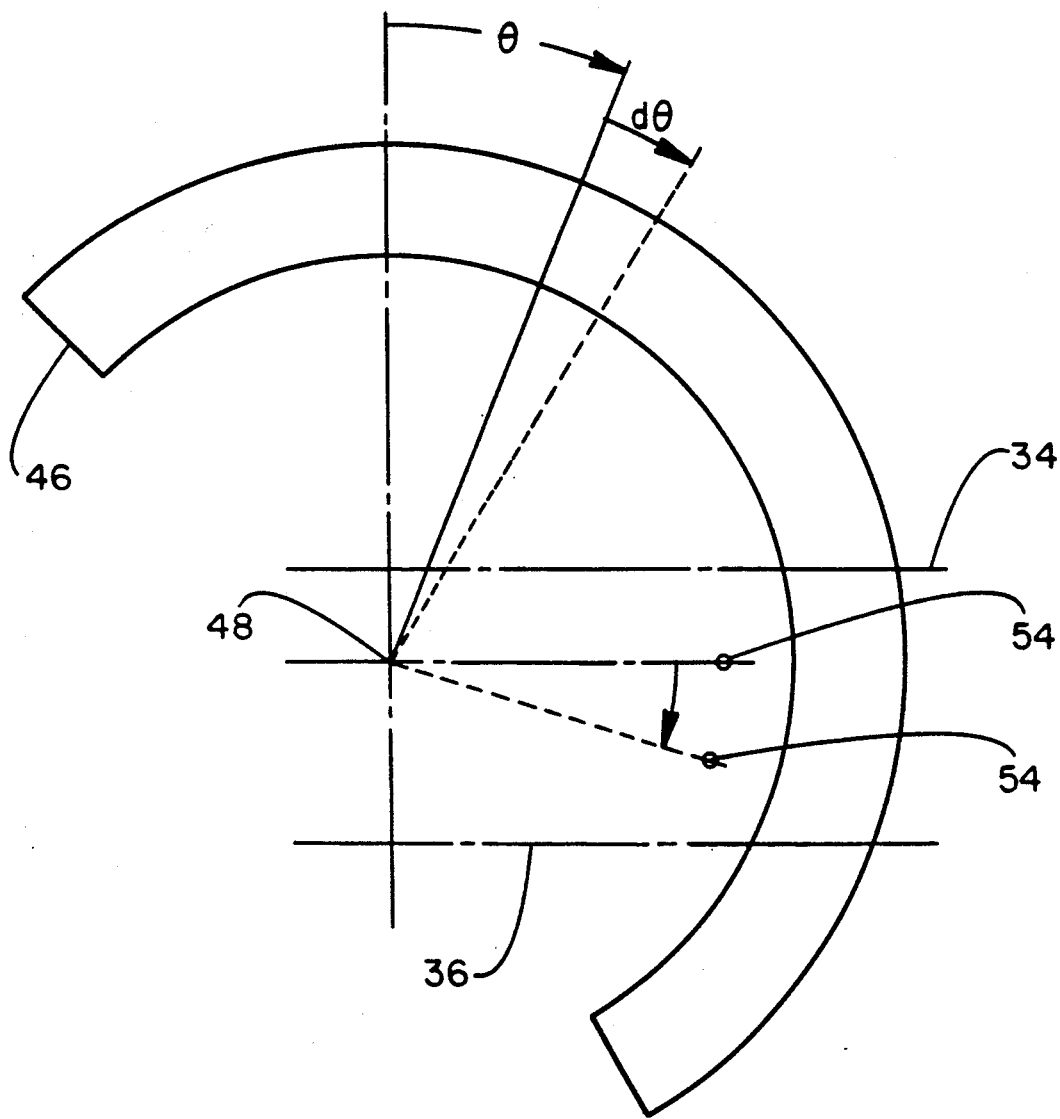
FIG. 7 is a view along the axis of the theoretical generating gear also shown in FIG. 5.

The nature of this mismatch is controlled by a supplemental motion which distinguishes the theoretical generating gear from the basic member. It is important that the supplemental motion provides for defining conjugate tooth surfaces 38 in the gear-shaped tool that are mismatched with respect to the surfaces of the tool that would be conjugate to the desired surfaces 40 of the work gear. In other words, it is important that additional stock is removed from the gear-shaped tool. Further, it is preferred that the supplemental motion is timed with the rotation of the theoretical generating gear about its axis 48 so that the amount that the tool is mismatched (i.e., the amount that the surfaces of the tool depart from conjugacy with the desired surfaces of the work gear) is made a function of the relative rotational position of the theoretical generating gear with respect to the work gear. For example, considering a rotational angle Θ (see FIG. 7) of the theoretical generating gear 46 and the lead Lb of the basic member 44 from which the theoretical generating gear departs, velocity along the axis of the theoretical generating gear may be modified in accordance with the following relationship:

$$Vh = Lb + (Ah*\Theta)$$

where Ah is a coefficient of linear acceleration along the axis of the theoretical generating gear and Vh is the instant linear velocity of the theoretical generating gear along its axis. Note that the velocity of the theoretical generating gear along its axis departs from that of the basic member by the term (Ah*Θ).

The displaced position of the theoretical generating gear about its axis may be referenced as follows:

$$Dh = (Lb*\Theta) + (0.5*Ah*\Theta^2)$$

where the term (0.5*Ah*Θ²) is the amount that the position of the theoretical generating gear along its axis differs from the position of the basic member.

It may be noted from the just-above equations describing the linear velocity Vh and displacement Dh of the theoretical generating gear that at rotational positions of Θ equal to zero, the velocity and displacement of the theoretical generating gear match the velocity and displacement of the basic member. Accordingly, at any selected rotational position of the theoretical generating gear at which Θ equals zero, the gear-shaped tool 30 and work gear 32 contact along an instant line 52 (see FIG. 6) on the desired tooth surfaces 40 of the work gear. However, at all other referenced rotational positions at which Θ does not equal zero, the surfaces of the tool depart from conjugacy with the desired surfaces of the work gear.

One important characteristic of this departure may be measured by difference angle dΘ between rotational positions of the theoretical generating gear required for bringing a point 54 on the surface of the theoretical generating gear into contact with the respective surfaces 38 and 40 of the gear-shaped tool and work gear. It may be appreciated that an additional rotation of the theoretical generating gear about its axis 48 required to bring a point on the theoretical gear into contact with the gear-shaped tool is kinematically equivalent to rotating the gear-shaped tool in an opposite direction about the axis of the theoretical generating gear. Also, the other motions of the theoretical generating gear (e.g., motions Vh along the axis of the theoretical generating gear) with respect to the work gear are similarly equivalent to the corresponding motions of the gear-shaped tool with respect to the theoretical generating gear. Thus, it is possible to move the gear-shaped tool to a relative position equivalent to a rotated position of the theoretical generating gear. In accordance with the present invention, the gear-shaped tool may be rotated through the negative of angle dΘ in the manner of the relative motion of the theoretical generating gear so that a point of contact between the work gear 32 and theoretical generating gear 46 is also a point of contact with the gear-shaped tool 30.

At each rotated position of the gear-shaped tool with respect to the work gear about the axis 48 of the theoretical generating gear corresponding to the additional rotation of the theoretical generating gear with respect to the gear-shaped tool through angle dΘ, a different instant line of contact is defined between the gear-shaped tool and work gear. In other words, the gear-shaped tool may be moved in the manner of the theoretical generating gear for representing different rotational positions of the theoretical generating gear with respect to the work gear.

Since the gear-shaped tool is moved in a manner representing rotation of the theoretical generating gear, the relative rotation between the gear-shaped tool and work gear about their respective axes must be adjusted in accordance with the timed relationship (i.e., the ratio of tooth numbers) between rotations of the theoretical generating gear and work gear. However, the timed generating motion between the theoretical generating gear and work gear may be superimposed on any speed of relative rotation between the gear-shaped tool and work gear about their respective axes. Thus, motions between the gear-shaped tool and work gear required to generate the desired tooth surfaces of the work gear may be controlled independently of the indexing motions of the gear-shaped tool and work gear about their respective axes.

It may be appreciated that although the abrasive surfaces 38 of the gear-shaped tool are intended to generate the desired surfaces 40 of the pinion work gear, the surfaces of the tool are defined by the known desired surfaces of the work gear and the relative motions of the tool with respect to the work gear. In other words, the surfaces 38 of the tool are defined by the reverse process by which the tool is intended to generate tooth surfaces in the work gear. That is, the surfaces of the tool are defined conjugate to the complementary surfaces of theoretical generating gear 46 that are, in turn, defined by the desired tooth surfaces 40 of the work gear.

Figure 8:
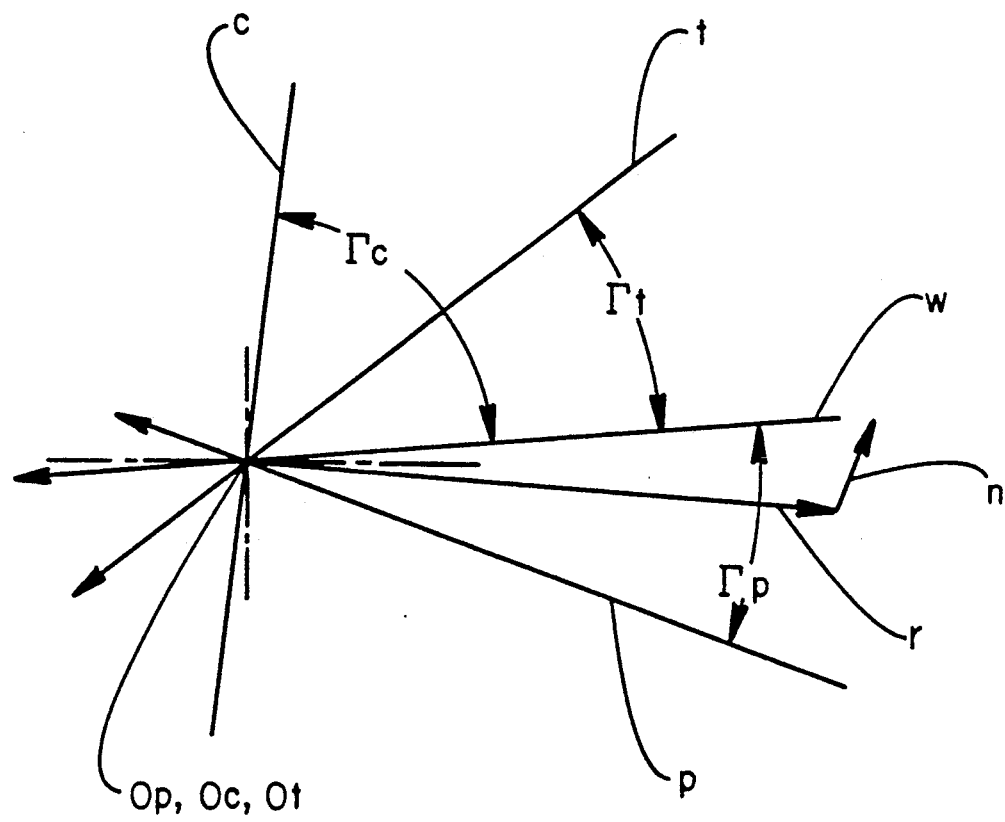
FIG. 8 is a vector construction showing relationships between the axes of the gear-shaped tool, work gear and theoretical generating gear in a plane parallel to all three axes.
Figure 9:
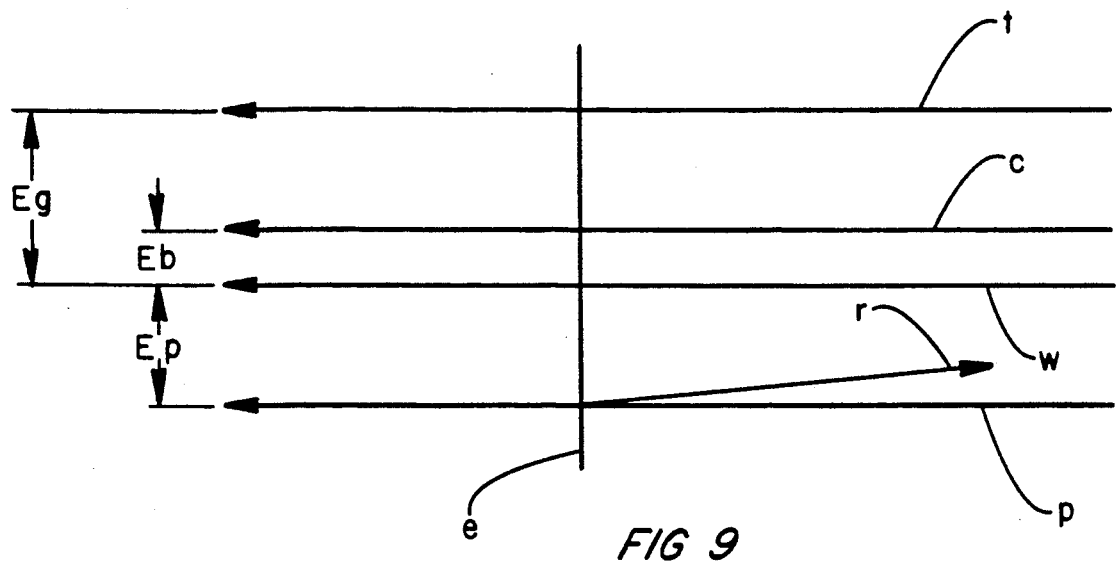
FIG. 9 is another view of the vector construction in a perpendicular plane in which the axes project parallel to one another.

Since points which define the surfaces of the theoretical generating gear and tool are related directly or indirectly to points of conjugacy with known points on the desired surface of the work gear, points on the surfaces of the theoretical generating gear and gear-shaped tool may be found by relatively simple vector mathematics. For example, given a vector r (see FIGS. 8 and 9) from pinion work gear crossing point 0p to a point on the desired surface 40 of the work gear and a normal vector n to the surface of the work gear at the point r, the following procedure may be followed to find points on the surfaces of the theoretical generating gear and gear-shaped tool.

Tool axis t, work axis p and theoretical generating gear axis c may be defined in the following vector format:

$$t = [-\cos \Gamma t, 0, \sin \Gamma t]$$

$$p = [-\cos \Gamma p, 0, -\sin \Gamma p]$$

$$c = ]-\cos \Gamma b, 0, \sin \Gamma b].$$

A unit offset vector e directed from the work gear crossing point 0p to the tool crossing point 0t may be found as follows:

$$e = [p \times t]_{unit}$$

where the symbol "x" indicates the vector function of cross product and the subscript "unit" indicates that the magnitude of the vector quantity equals 1.

The respective offsets Et, Ep, and Eb of the tool, work gear and theoretical generating gear may be found by the same equations described above for the ring gear, pinion and basic member, respectively. Also, the number of teeth Nb and lead Lb of the theoretical generating gear may also be found by the same equations presented for finding these quantities for the basic member. However, the earlier described relative velocity and displacement terms Vh and Dh of the theoretical generating gear may be understood to modify relative motions of the basic member along its common axis c with the theoretical generating gear.

A point of conjugacy between a pair of gears may be found by rotating a known point of contact on one member about its axis until a component of the relative velocity of the known point in the direction of the tooth normal is equal to zero. Accordingly, the known point r and normal n may be rotated about axis p through angle $\Theta p$ until the condition for a point of contact with the theoretical generating gear is fulfilled. Such rotations may be represented in the following format:

$$r_1 = r\{p, \Theta p\}^R$$

$$n_1 = n\{p, \Theta p\}^R$$

varying $\Theta p$ until $(v_1 \cdot n_1) = 0$ where the symbol $\{p, \Theta p\}^R$ represents a rotational matrix for rotating a vector $\Theta p$ radians about vector p, and the symbol "·" indicates the vector function of dot product. The relative velocity $v_1$ includes not only components due to the relative rotation of the theoretical generating gear and work gear about their respective axes but also a component due to the relative linear translation between them. Referenced in units of work gear rotation through angle $\Theta p$, a relative velocity component Vhp may be found as follows:

$$Vhp = (Lb^* X1) - (Ah^* X1^2 {}^*\Theta p)$$

where the term "X1" is equal to the number of teeth Np in the work gear divided by the number of teeth Nb in the theoretical generating gear.

Other interim relationships which may be used to simplify the forthcoming expression for relative velocity $v_1$ include relative angular velocity vector $w_1$ and offset distance Ept between the axes p and c of the work gear and theoretical generating gear. The vector $w_1$ and the distance Ept may be defined as follows:

$$w_1 = [X1c + p]$$

$$Ept = -(Ep + Eb)$$

where the scaler quantity X1 next to vector c indicates the vector function of multiplication by a scaler quantity.

The expression for the relative linear velocity $v_1$ of a point $r_1$ between the work gear and theoretical generating gear may now be written as:

$$v_1 = [w_1 \times r_1] + [p \times Ept \, e] + Vhp \, c.$$

Once the value of $\Theta p$ is found which fulfills the condition for a point of contact, the vector $r_1$ may be referenced with respect to crossing point 0c to define a point $r_2$ on the surface of the theoretical generating gear. The vector $r_2$ may be determined as follows:

$$r_2 = [r_1 + Ept \, e].$$

Having found a point on the tooth surface of the theoretical generating gear, a similar condition for a point of contact may be used to find a point on the surface of the gear-shaped tool. However, it should be noted that any rotation of the theoretical generating gear about its axis also involves a displacement along its axis. The amount of displacement is a function of the implied amount of rotation of the theoretical generating gear $\Theta$ due to the rotation of the work gear through angle $\Theta p$ as well as any additional rotation of the theoretical generating gear through angle $d\Theta$ required to make a point of contact with the gear-shaped tool. The implied amount of rotation of the theoretical generating gear is found by the following expression:

$$\Theta = X1 {}^*\Theta p.$$

An expression for the amount of displacement of the theoretical generating gear rotating about its axis with the gear shaped tool follows:

$$Xh = (Lb^* d\Theta) + (0.5^* Ah^* d\Theta^2) + (Ah^* d\Theta {}^*\Theta).$$

Similarly, an expression for the transitional velocity of the theoretical generating gear along its axis is found as the following derivative of the displacement:

$$Vh = Lb + Ah^*(d\Theta + \Theta).$$

Accordingly, for finding a point of conjugacy with the gear-shaped tool, the vector $r_2$ must be first referenced as a new vector $r_3$ incorporating displacement of the theoretical generating gear as follows:

$$r_3 = [r_2 - Xh \, c]$$

Rotation of the theoretical generating gear through angle $d\Theta$ is incorporated into vectors $r_4$ and $n_2$ as follows:

$$r_4 = r_3\{-c, d\Theta\}$$

$$n_2 = n_1\{-c, d\Theta\}.$$

A forthcoming expression for relative velocity $v_2$ between the theoretical generating gear and gear-shaped tool may be simplified by interim relationships similar to those were used in the expression for $v_1$. They are:

$$X2 = Nt/Nc$$

$$Ecg = -(Eg - Eb)$$

$$w_2 = [X2t - c].$$

Incorporating these terms, relative velocity $v_2$ may be written as follows:

$$v_2 = [w_2 \times r_4] - [c \times Ecg \, e] - Vh \, c.$$

In accordance with the condition for a point of contact, the angle $d\Theta$ may be varied until the relative velocity $v_2$ of the point $r_4$ in the direction of $n_2$ is equal to zero. A point on the surface of the gear tool may be referenced to the tool crossing point $O_t$ by vector $r_5$ as follows:

$$r_5 = [r_4 + E_{cg}\, e].$$

Other points on the tooth surfaces of the theoretical generating gear and work gear may be found by repeating the above vector calculations for other points on the desired tooth surface of the work gear. It may be noted that the angle $d\Theta$ of the above calculations may be considered as a measure of the amount that the theoretical generating gear of the present invention departs from a basic member. In other words, the angle $d\Theta$ would equal zero if the theoretical generating gear were to be defined as a basic member.

INDUSTRIAL APPLICABILITY

Figure 10:
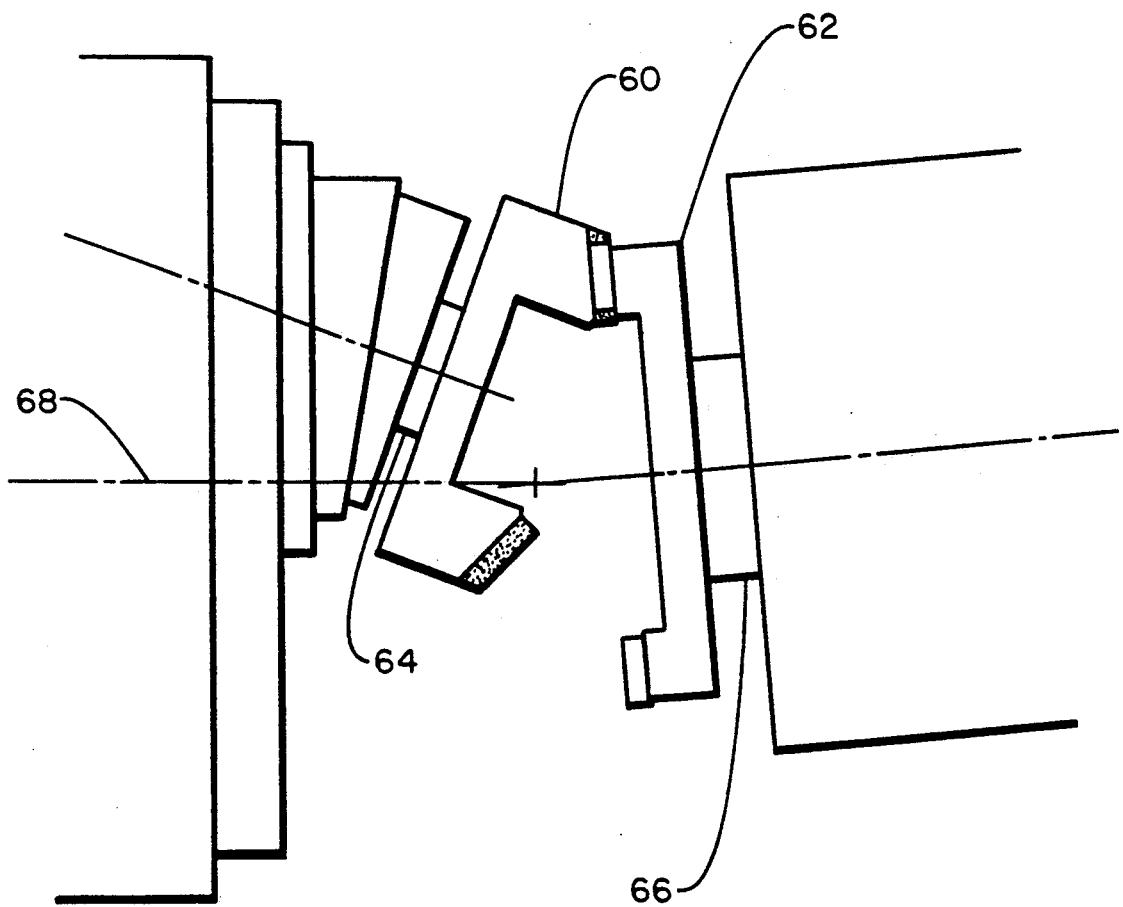
FIG. 10 is a partial view of a conventional bevel and hypoid gear generating machine arranged for practicing the method of the present invention.

The new gear-shaped tool and method for finishing tooth surfaces in bevel and hypoid gears may be practiced with machines configured in the manner of bevel hypoid gear generating machines used for continuous indexing operations. For example, it is contemplated that gear-shaped tool 60 of the present invention could be mounted on the tool spindle 64 (see FIG. 10) of such a machine and rotated in a timed relationship with work gear 62 mounted as usual on work spindle 66. However, higher speed tool and work spindles would be required to obtain indexing rate between the tool and gear at appropriate grinding speeds.

Known bevel and hypoid gear generating machines also include a machine cradle axis 68 (or can effectively represent such an axis, see, for example WO 89/01838) to which the tool spindle 64 may be oriented and about which the tool spindle may be rotated. Rotation of work gear 62 may also be timed with differential rotations of the tool spindle about cradle axis 68. The known machines also provide for moving the work spindle in the direction cradle axis 68 in time with rotation of the tool spindle about the cradle axis. Together, rotation of the gear-shaped tool about cradle axis 68 and translation of gear-shaped tool along the cradle axis in a timed relationship to differential work gear rotation may be used to represent motions of the theoretical generating gear of the present invention rolling through mesh with the gear.

According to the method of the present invention, the gear-shaped tool of the present invention is mounted on the tool spindle 64, and the work gear is mounted on work spindle 66. The tool and work gear are rotated about their respective axes in a timed relationship in accordance with their respective tooth numbers. The rate of this indexing motion is controlled to achieve desired grinding speeds. The tool and work gear are moved into operative engagement with each other at a first relative position between their respective axes for finishing a single instant line of contact on the desired surface of the work gear. The tool is also rotated about machine cradle axis 68 and translated relative to the work gear in a timed relationship with a differential rotation of the work gear in the manner of a theoretical generating gear rolling through mesh with the work gear. This generating motion provides for moving the respective axes of the tool and work gear to different relative positions for finishing other instant lines on the desired tooth surface of the work gear. The rate at which the generating motion is applied may be controlled independently of the indexing rate and may be adjusted in process for such purposes as maintaining substantially constant rates of stock removal over the course of work gear tooth surfaces or other known criteria for controlling a feed rate. It is also contemplated that the relative path of the generating motions may be modified make ordinary developmental changes to work gear tooth surface geometry.

Tooth surfaces of the gear-shaped tool of the present invention may be made by the reverse of the process by which the tool generates the desired tooth surface of the work gear. For example, the desired tooth surface of the work gear could be plated with an abrasive material and moved relative to the tool in the same manner that the tool is intended to be moved relative to the work gear in accordance with the method of the present invention. However, it is also contemplated that having positively defined the tooth surfaces of the tool, one or more of the conventional methods for forming tooth surfaces in bevel and hypoid gears may be used to form the tooth surfaces of the tool. Although for purposes of clarity the present invention has been described with respect to specific embodiments, it will be appreciated by those of skill in art that the present invention contemplates a very fundamental departure from the known teaching of the art which have obvious significance to the design and use of a wide variety of gear-shaped tools having generated mismatch with the desired surfaces of a work gear. For example, the present invention provides a great deal of flexibility for designing and using gear-shaped tools. In addition to the usual design parameters of gear-shaped tools (e.g. shaft angle, offset and number of teeth), the present invention provides for modifying tooth surfaces of the tool in accordance with similar design parameters of the theoretic generating gear. It would also be possible to define different theoretical generating gears for separately finishing the opposite sides of work gear teeth.

What is claimed is:

1. A method of finishing tooth surfaces in bevel and hypoid gears using a gear-shaped tool abrasive having stock-removing tooth surfaces comprising the steps of:
imparting relative rotation between said gear-shaped tool and a work gear about their respective axis in a timed relationship according to their respective tooth numbers; and superimposing relative motion between said gear-shaped tool and said work gear for generating desired tooth surfaces of said work gear in the manner of said work gear rolling in mesh with a theoretical generating gear which departs from requirements of a basic member defined by said relative rotation of the gear-shaped tool and work gear about their respective axes.

2. The method of claim 1 wherein said relative rotation of the gear-shaped tool and work gear about their respective axes forms a single line of contact between said abrasive surfaces of the gear-shaped tool and said desired surfaces of the work gear.

3. The method of claim 2 wherein said superimposed relative motion between the gear-shaped tool and work gear provides for moving said respective axes of the gear-shaped tool and work gear to different relative positions whereat said relative rotation of the gear-shaped tool and work gear about their respective axes forms other lines of contact between said abrasive surfaces of the gear-shaped tool and said desired surfaces of the work gear.

4. The method of claim 3 wherein said superimposed relative motion between the gear-shaped tool and work gear includes a relative rotation between said gear-shaped tool and said work gear about an axis corresponding to an axis of rotation of said theoretical generating gear and a relative translation between said gear-shaped tool and work gear corresponding to a translating motion of said theoretical generating gear with respect to said work gear.

5. The method of claim 4 wherein said theoretical generating gear departs from said requirements of the basic member by a supplemental motion timed with said relative rotation between the gear-shaped tool and work gear about the axis of the theoretical generating gear.

6. The method of claim 5 wherein both said desired tooth surfaces of the work gear and said stock-removing surfaces of the gear-shaped tool are defined conjugate to tooth surfaces of said theoretical generating gear.

7. The method of claim 6 wherein said supplemental motion includes a component of acceleration.

8. The method of claim 7 wherein said supplemental motion includes a component of linear acceleration directed along said axis of the theoretical generating gear.

9. The method of claim 8 wherein said theoretical generating gear departs from said requirements of the basic member by a supplemental motion timed with a supplemental relative rotation between said gear-shaped tool and work gear about their respective axes.

10. The method of claim 9 wherein said supplemental motion includes a component of acceleration.

11. A method of generating tooth surfaces in bevel and hypoid gears comprising the steps of:
mounting a gear-shaped tool having stock-removing tooth surfaces for rotation about its axis;
mounting a work gear for rotation about its axis;
rotating said gear-shaped tool and said work gear about their respective axes in a timed relationship in accordance with their respective tooth numbers;
moving said gear-shaped tool and work gear into contact with each other in a relative position at which their respective axes are offset from one another;
relatively rotating said gear-shaped tool with respect to said work gear about an axis angularly related to said respective axes of the tool and work gear in a timed relationship with a supplemental relative rotation between said gear-shaped tool and said work gear about their respective axes; and
relatively translating said gear-shaped tool with respect to said work gear in a timed relationship with said supplemental relative rotation between the gear-shaped tool and work gear about their respective axes.

12. The method of claim 11 wherein said rotations of the gear-shaped tool and work gear about their respective axes defines a relative angular velocity directed along an instant axis of rotation and a relative linear velocity along said instant axis of all common points between the gear-shaped tool and work gear located on said instant axis in a fixed ratio with said relative angular velocity; and said relative rotation of the gear-shaped tool with respect to the work gear about the angularly related axis and said relative translation of the gear-shaped tool with respect to the work gear in said timed relationships with the supplemental relative rotation between the gear-shaped tool and work gear defines a ratio of relative linear velocity to relative angular velocity along said instant axis which departs from said fixed ratio.

13. The method of claim 12 wherein a rate of said relative rotation of the gear-shaped tool with respect to the work gear about the angularly related axis is controlled independently of a rate of said rotations or the gear-shaped tool and work gear about their respective axes.

14. The method of claim 13 wherein said rate of relative rotation of the gear-shaped tool with respect to the work gear about the angularly related axis is varied to improve conditions for desired stock removal.

15. The method of claim 13 wherein one of said relative rotation of the gear-shaped tool with respect to the work gear about the angularly related axis and said relative translation of the gear-shaped tool with respect to the work gear is modified to make a developmental change to desired work gear tooth geometry.

16. A gear-shaped tool for finishing desired tooth surfaces in bevel and hypoid work gears comprising an axis of rotation and abrasive stock-removing tooth surfaces defined conjugate to tooth surfaces of a theoretical generating gear having complementary surfaces conjugate to said desired surfaces in said work gear; said theoretical generating gear departing from requirements of a basic member between said gear-shaped tool and said work gear.

17. The gear-shaped tool of claim 16 in which said abrasive stock removing surfaces share a single line in common with tooth surfaces defined about said axis of rotation conjugate to said desired surfaces of the work gear.

18. The gear-shaped tool of claim 17 wherein said tooth surfaces of the theoretical generating gear share the same single line in contact at one rotational position about its axis and all other points on said tooth surfaces of the theoretical generating gear contact said abrasive surfaces of said tool at different rotational positions of said theoretical generating gear than the rotational positions at which the same points contact said desired tooth surfaces of the work gear.

19. The gear-shaped tool of claim 18 wherein said theoretical generating gear includes an axis of rotation substantially coincident with an axis of rotation of said basic member; said theoretical generating gear axis being offset with respect to an axis of rotation of said work gears by substantially the same amount that said axis of the basic member is offset from said axis of said work gear.

20. The gear-shaped tool of claim 19 wherein said theoretical generating gear departs from said basic member by a component of acceleration.

21. A method of making a gear-shaped tool for finishing tooth surfaces in bevel and hypoid gears comprising the steps of:
arranging desired tooth surfaces of a work gear to perform a stock removing function;
imparting relative rotation between said work gear and said gear-shaped tool about their respective axes in a timed relationship according to their respective tooth numbers;
superimposing relative motion between said work gear and said gear-shaped tool for generating desired tooth surfaces of said gear-shaped tool in the manner of said gear-shaped tool rolling in mesh with a theoretical generating gear which departs from requirements of a basic member defined by said relative rotation of the work gear and gear-shaped tool about their respective axes; and arranging said desired surfaces of the gear-shaped tool to perform a stock removing function.

* * * * *